(12) United States Patent
Stahl

(10) Patent No.: US 7,056,541 B1
(45) Date of Patent: *Jun. 6, 2006

(54) COATED CHEWING GUM, A METHOD FOR PREPARATION THEREOF AND THE USE OF ONE OR MORE ACTIVE SUBSTANCE(S) IN SOLID FORM

(75) Inventor: Bronislaw-Jan Stahl, Vejle (DK)

(73) Assignee: Dandy A/S, Vejle (DK)

( * ) Notice: Subject to any disclaimer, the term of this patent is extended or adjusted under 35 U.S.C. 154(b) by 0 days.

This patent is subject to a terminal disclaimer.

(21) Appl. No.: 09/623,425

(22) PCT Filed: Mar. 3, 1999

(86) PCT No.: PCT/DK99/00108

§ 371 (c)(1),
(2), (4) Date: Mar. 26, 2001

(87) PCT Pub. No.: WO99/44436

PCT Pub. Date: Sep. 10, 1999

(30) Foreign Application Priority Data

Mar. 4, 1998 (DK) ...................... 0296/98

(51) Int. Cl.
*A23G 3/30* (2006.01)
(52) U.S. Cl. ............................. 426/5; 426/98
(58) Field of Classification Search ............... 426/5, 426/89, 103, 285, 302, 303, 304, 305, 306, 426/658, 660, 98
See application file for complete search history.

(56) References Cited

U.S. PATENT DOCUMENTS

| 4,238,475 A | 12/1980 | Witzel et al. |
| 4,250,195 A | 2/1981 | Cherukuri et al. |
| 4,911,934 A | 3/1990 | Yang |
| 4,931,295 A | 6/1990 | Courtright et al. |
| 5,298,263 A | 3/1994 | Yatka et al. |
| 5,380,530 A | 1/1995 | Hill |
| 5,425,961 A | 6/1995 | Yatka et al. |
| 5,431,929 A | 7/1995 | Yatka et al. |
| 5,487,902 A | 1/1996 | Andersen |
| 5,525,360 A | 6/1996 | Yatka et al. |
| 5,569,477 A | 10/1996 | Nesbitt |
| 5,603,970 A * | 2/1997 | Tyrpin et al. .................. 426/5 |
| 5,783,725 A | 7/1998 | Kuhn |

FOREIGN PATENT DOCUMENTS

| EP | 0263224 | 4/1988 |
| EP | 0435698 | 7/1991 |
| EP | 0531692 | 7/1992 |
| GB | 249 816 | 3/1925 |
| JP | 4173056 | 6/1992 |
| JP | 09-227455 | 9/1997 |
| RU | 566505 | 7/1977 |
| WO | WO 9109989 | 7/1991 |
| WO | WO 9308700 | 5/1993 |
| WO | WO 97/04662 A | 2/1997 |
| WO | WO 97/041662 A | 2/1997 |
| WO | WO 97/20473 | 6/1997 |
| WO | WO 9733485 | 9/1997 |
| WO | WO 9814070 | 4/1998 |
| WO | WO 98/23165 | 6/1998 |
| WO | 9913734 | 3/1999 |

* cited by examiner

*Primary Examiner*—Keith Hendricks
(74) *Attorney, Agent, or Firm*—Hunton & Williams

(57) ABSTRACT

A coated chewing gum comprising a core of chewing gum and a coating comprising a coating material and one or more active substances in solid form. The use of an active substance in solid form in the coating of a coated chewing gum provides a fast onset of the effect, a better stability of the active substance, and an increased effect thereof in al chewing phases.

27 Claims, 14 Drawing Sheets

Scale : 0  3.75  7.50  11.25  15

Start phase

Intermediate phase

End phase

Scale: 0  3.75  7.50  11.25  15

Start phase

Intermediate phase

End phase

COATED CHEWING GUM, A METHOD FOR PREPARATION THEREOF AND THE USE OF ONE OR MORE ACTIVE SUBSTANCE(S) IN SOLID FORM

TECHNICAL FIELD

The present invention relates to a coated chewing gum comprising a core of chewing gum and a coating comprising a coating material as well as one or more active substance(s) in solid form. Furthermore, the invention relates to a method for the preparation of a coated chewing gum and the use of one or more active substance(s) in solid form in the coating of a coated chewing gum.

TECHNICAL BACKGROUND

Coated chewing gum is prepared by coating a core of chewing gum with a number of layers of coating. The coating most often takes place in rotating coating kettles in which cores of chewing gum are rotated and coating suspension is applied in small portions that disperse evenly over the surfaces of the cores. Subsequently, the coated cores are dried by means of air.

These coating operations may be applied in up to approx. 90 increments until the preferred coating thickness is obtained, and the product has the preferred measures and the preferred weight.

The coating suspension is often an aqueous solution of a sugar or the like applied at an elevated temperature to ease the coating process.

In order to provide a fast flavour onset, often one or more flavour(s) is/are applied and possibly other active substances between the applications of the coating suspension. The active substance(s) is/are added in liquid form in one or more increment(s).

A chewing gum with a completed coating is normally finally treated with a surface layer of a wax or the like.

The tablets with a completed coating are then subjected to a hardening process during the following approx. 8 weeks. Sugar alcohols such as sorbitol and xylitol thus form crystals whereby the chewing gum obtains a harder and a "crunchy" coating. The crystallisation process also provides a more porous coating structure. Thus, a migration of water, moisture and flavour takes place through the formed micro channels.

This causes the chewing gum to gradually lose its flavour, ethereal oils, if any, are oxidised, and the chewing gum loses moisture and gets harder.

Furthermore, the use of active substances in liquid form in the coating layers has the disadvantage that some of the active substances are lost to the surroundings during the coating process.

It has now been found that by using active substances in solid form in the coating layers of conventional chewing gum, an increased stability of the active substance is obtained. Furthermore, a faster onset of the effect is achieved, and by using flavour in solid form, a longer lasting explosion of taste compared with chewing gum coated with a liquid flavour. Finally, according to the invention, a more environmentally desirable manufacturing process is obtained since the use of an active substance in solid form causes less evaporation of volatile substances.

DISCLOSURE OF THE INVENTION

Thus, the invention relates to a coated chewing gum comprising a core of chewing gum and a coating which comprises a coating material, and one or more active substance(s), which chewing gum is characterised in that the active substance(s) is/are added in solid form.

Furthermore, the invention relates to a method for the preparation of a coated chewing gum according to the invention, which method is characterised in that it comprises the following steps:

1) preparation of a core of chewing gum in a manner known per se,
2) preparation of a coating suspension, also in a manner known per se,
3) repeated applications of the coating suspension onto the cores of chewing gum also in a manner known per se, preferable at a temperature in the interval 30–90° C., preferably 35–75° C.,
4) Applying on the coating of one or more active substance(s) in solid form in one or more increment(s) after the application of the coating suspension, and optionally repeating step 3) and 4)
5) optionally, application of one or more liquid active substance(s) in one or more increments between the applications of the coating suspension,
6) optionally, finally application of a surface layer.

Applying of the solid active substance(s) is/are preferable performed without drying of the coating suspension in order to enable adherence of a substantial amount of the substance(s) in solid form to the coating. The drying time for the coating suspension depends on the specific coating formulation, however, the active substance(s) is/are added to the coated chewing gum substantially without delay after the coating processes are finished. If desired, the coated chewing gum may be wetted before adding the active substance(s) in solid form in case the coating has been allowed to dry for too long time whereby the coated chewing gum is no longer sticky.

The coating process may be repeated as many times as needed in order to obtain the desired thickness of the coating. In the coating process, the active substance(s) in solid form may be added between one or more of the ordinary coating processes. The last layer of the coating process may also include the active substance(s) in solid form. It is also within the present invention to use different active substances in solid form in the same coating layer or use one active substance in one layer, and a second active substance in another layer. Such combinations of active substances may be flavour and high potent sweeteners or a medicament together with an substance decreasing an undesirable taste of the medicament.

As the active substance(s) is/are located in the outer part of the coating, the active substance(s) is/are exposed to the consumer within a short period of chewing. Accordingly, in a further embodiment, the invention relates to the use of one or more active substance(s) in solid form in the coating of a coated chewing gum in order to obtain a fast onset of the effect.

A further advantage of the admixture of the active substance(s) in solid form is that the solid form is more resistant to decomposition. Accordingly, the invention also relates to the use of one or more active substance(s) in solid form in the coating of a coated chewing gum in order to obtain a better stability of the active substance(s).

Finally, the invention relates to the use of one or more active substance(s) in solid form in the coating of a coated chewing gum in order to obtain an increased effect of the active substance(s) in all chewing phases.

BRIEF DESCRIPTION OF THE DRAWING

The invention is further illustrated by means of the drawing, in which.

Figure 1:
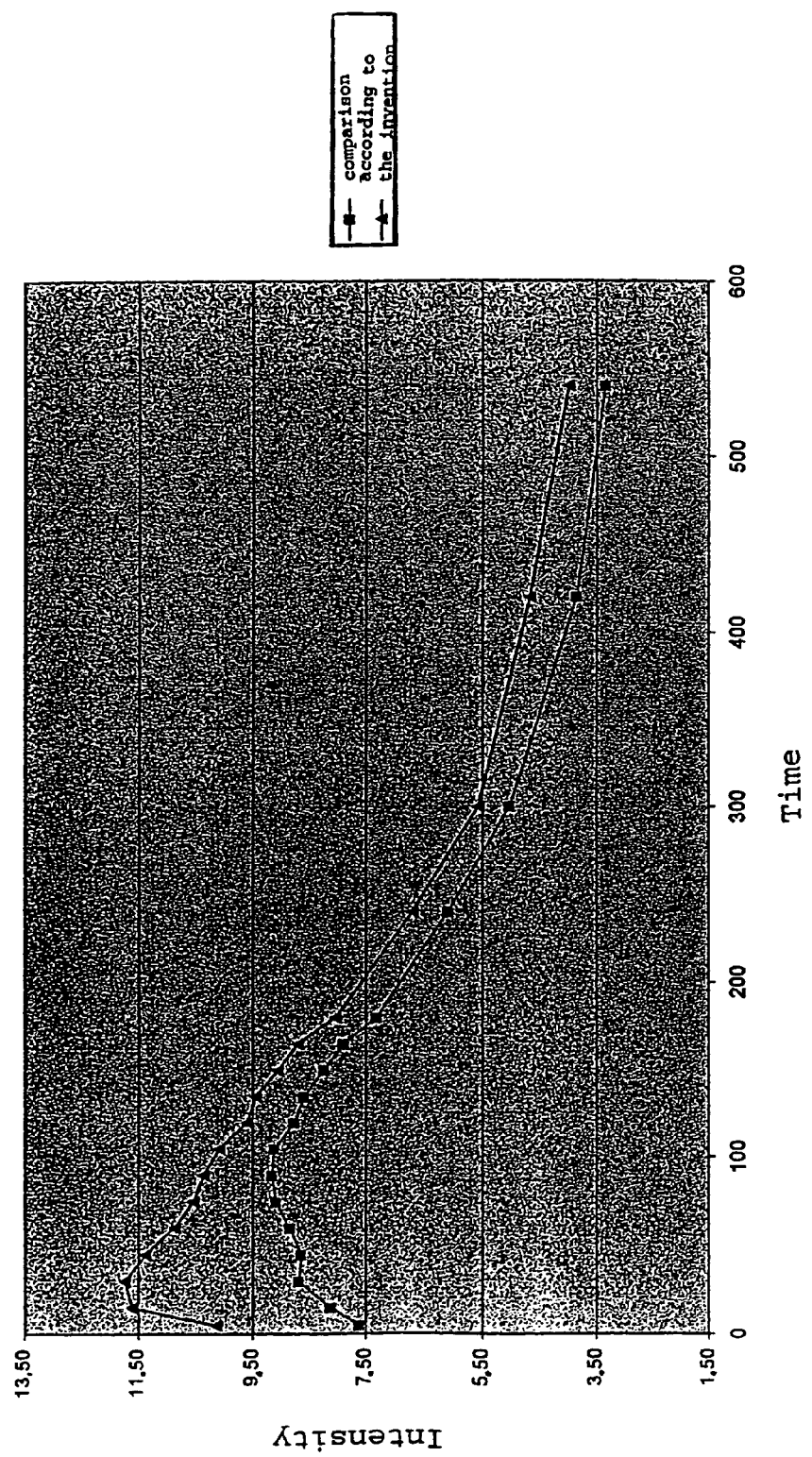
FIG. 1 shows the release of flavour as a function of time by using menthol/anethol/eucalyptus flavour in encapsulated form and liquid form, respectively.

The scope of the invention will appear from the detailed description below. However, it should be understood that the detailed description and the specific examples, while indicating preferred embodiments of the invention, are given by way of illustration only, since various changes and modifications within the scope of the invention will become apparent for those skilled in the art from the detailed description.

DETAILED DESCRIPTION OF THE INVENTION

The active substances are selected among flavours, acids, salts, high potent sweeteners, and functional substances.

Aromas, which may be incorporated into the chewing gum according to the invention, are selected among natural, naturally identical or synthetic flavours, as well as plant extracts. Examples of applicable flavours are for example peppermint, periwinkle, eucalyptus, spearmint, anethol, menthol, powdered anise, and fruit flavours such as orange, lemon, mango, pineapple, lime, strawberry, cherry, black currant, blueberry, raspberry, wild berry, cranberry, apple, pear, banana, prune, and plum flavour, etc.

The plant extracts which may be applied instead of or together with one or more of the above-mentioned flavour(s) are preferably selected among extracts of liquorice, coffee, tea, herbs such as sage, thyme, basil, bergamot, balm, valerian, camomile, lavender, aloe vera, and spices such as pepper, cinnamon, *capsicum*, paprika, tarragon, fennel, mustard, dill, caraway, parsley, tomato, etc.

The use of plant extracts in coated chewing gum provides the possibility of preparing novel combinations of flavour and new flavour experiences.

In a preferred embodiment of the invention the active substance(s) is/are a natural vegetable flavouring agent such as fruit and herbs. Accordingly the substance may be selected among coconut, grape fruit, orange, lime, lemon, mandarin, pineapple, strawberry, raspberry, mango, passion fruit, kiwi, apple, pear, peach, apricot, cherry, pineapple, grapes, banana, cranberry, blueberry, black currant, red currant, gooseberry, and lingonberry, thyme, basil, valerian, fennel, parsley, camomile, tarragon, lavender, dill, cumin, bergamot, sage, aloe vera, spearmint, peppermint, eucalyptus and mixtures thereof.

It is furthermore an advantage that the natural flavouring agent is dried. A dried agent may have a more intense flavour and may further increase the stability of the flavour because many of the notes of the taste are still present in the more or less intact cells of the fruit or herb. The limited content of water is also an important factor with respect to stability.

In a further aspect, the water content of the natural flavouring agent is less than 75% by weight, such as less than 60%, preferable less than 40%, more preferred less than 30%, such as less than 25%. However, in situations where a less water content is desired (for stabilty reasons or with respect to have an increased flavour sensation), the water content of the natural flavouring agent is less than 20% by weight, such as less than 15%, more preferred less than 10% such as between 1.5–7%, more preferred between 2–6%.

In a preferred embodiment, the natural flavouring agent is freeze-dried.

The natural flavouring agent in solid form may be in the form of a powder, slices or pieces, or combinations thereof. When a natural vegetable flavour is used, it is generally accepted or even desired that a feeling of small pieces of the flavour agent be recognised by the consumer in the chewing process. Accordingly, the natural flavouring agent may be in a form where the particle size is up to 3 mm or even more. However smaller pieces are preferred and in a further aspect, the particle size is less than 3 mm, such as less than 2 mm, more preferred less than 1 mm, calculated as the longest dimension of the particle.

In other situations it may be an advantage to have different sizes of the particles and an example is wherein the natural flavouring agent is in a form where the particle size is from about 3µ to 2 mm, such as from 4µ to 1 mm. However, the skilled person may select any combination dependent on the desired final properties of the coated chewing gum.

As seeds from fruits may have a special flavour, the natural flavouring agent may comprise seeds from a fruit e.g. from strawberry, blackberry and raspberry, and which seeds are substantially intact.

In a still further aspect of the invention, the natural vegetable flavouring agent also provides the gum formulation with natural colour. With seeds of a vegetable or fruit flavouring agents such as strawberry and/or orange, it has been possible to obtain a marbling colouring of the chewing gum as well as a uniform colouring. Accordingly, in a further aspect of the invention, the active substance in solid form may be a colouring agent.

Various acids may also be applied as active substances, such as citric acid, malic acid, tartaric acid, lactic acid, and ascorbic acid or any other acid allowed in food and which is suitable. These may most conveniently be applied together with chewing gum with fruit flavour in order to obtain an improved freshness during the first phase of the chewing period.

Furthermore, according to the invention, instead of or together with one or more of the above-mentioned active substance(s), salts may be applied, such as sodium chloride, potassium chloride, ammonium chloride, sodium bicarbonate, and carbamide. Hereby an improved chewing gum taste during the initial chewing period is obtained, and in case of sodium bicarbonate and carbamide also an improved dental care effect.

In order to obtain a sweet taste during the initial chewing period, together with or instead of one or more of the above-mentioned active substance(s) sweeteners may be incorporated in the coating, preferably highly potent sweeteners. Especially suitable sweeteners are e.g. aspartame, acesulfame K, saccharin, cyclamate, neohespiridine, thaumatin, glycyrrhizin, and salts thereof, monellin, sucrolase, and alitame.

Finally, in order to obtain a specific effect together with or instead of one or more of the above-mentioned active substance(s), one or more functional substance(s) can be incorporated in the coating such as vitamins and nutrients, "cooling agents", flavour enhancers, enzymes, agents for care and treatment of the oral cavity, antiseptic agents, pharmaceuticals and herbal medicine.

"Cooling agents" and flavour enhancers are substances manufactured by so-called "flavour houses", and which substances are also known as "flavour enhancer", "cooling flavour", "physcol", "optacool", and the like. They are applied in order to make the taste stronger and fresh.

Examples of cooling agents are e.g. lactic acid menthyl ester, disclosed in EP 0794169 A1, mono menthylsuccinate, and salts thereof, disclosed in WO97/07771, and 4-(1-menthoxymenthyl)-2-phenyl-1.3-dioxolan and derivatives thereof, disclosed in U.S. Pat. No. 5,545,424.

Among the vitamins and the nutrients that may be incorporated in the chewing gum according to the invention special mention can be made, without limitation, of the vitamins A, $B_1$, $B_2$, $B_5$, $B_6$, $B_{12}$, $D_3$, E, K, folic acid, niacin, biotin, β-carotene, ascorbic acid, and salts thereof, amino acids, glycerophosphates, minerals in the form of salts, complexes and compounds containing calcium, phosphorus, magnesium, iron, zinc, copper, iodine, manganese, chromium, selenium, molybdenum, potassium, sodium, or cobalt and ubiquinon.

Among agents for the care and treatment of the oral cavity, special mention may be made of hydrogen peroxide, carbamide and carbamide releasing compounds, CPP (caseinphosphopeptide), fluorine compounds such as sodium fluoride, sodium monofluorophosphate, and stannofluoride, arginine, zinc compounds, strontium chloride and potassium nitrate.

Among antiseptic agents, special mention may be made of guanidine and biguanidine, such as chlorhexidine acetate, quaternary ammonium compounds such as benzalkonium chloride, cetylpyridinium chloride, and cetrimide, phenols such as tymol, triclosan, parachlorophenol, and cresol, hexachlorophen as well as salicylanilide compounds.

Enzymes may also be incorporated in the chewing gum according to the invention, e.g. papain, trypsin, amyloglucosidase, lactase, glucoseoxidase, streptokinase, streptodornase, dextranase, and mutanase.

Among pharmaceuticals, special mention may be made of caffeine, salicylic acid, and derivatives thereof, such as acetylsalicylic acid, choline salicylate, and magnesium salicylate, paracetamol, salts of pentazocine, buprenorphine, and buprenorphine hydrochloride, codeine hydrochloride and phosphate, morphine and salts thereof, methadone hydrochloride, ketobemidone, β blockers, calcium antagonists, verapamil hydrochloride, verapamil, nifedipine, nitroglycerin, erythrityl tetranitrate, strychnine and salts thereof, lidocaine, tetracaine hydrochloride, etorphine hydrochloride, atropine, insulin, alfa-amylase, polypeptides such as oxytocin, gonadorelin, and LHRH, desmopressin acetate (DDAVP), isoxsuprine hydrochloride, ergotamine compounds, chloroquine phosphate and sulfate, isosorbide, demoxytocin, heparin, lupeol, sucralfate and salts thereof, nicotine and salts and derivatives thereof, lobeline, cinnarizine, dimenhydrinate, difenhydramine, cyclizine, scopolamine, miconazole, nystatin, metronidazole, hydrocortisone, astemizole, benzocaine, glibenglamide, onsaedantronum, acyclovir, sumatriptan, tropisetron, pizotifen, cisapride, domperidone, itraconazole, omeprazole, terfenadine, fluconazole, naratriptan, zolmiriptan, rizatriptan, eletriptan, almotriptan, sildenafil, tolfenamic acid, tramadol, cetirzine, and loratidine.

Among herbal medicine special mention may be of *ginkgo biloba*, ginseng, saw palmetto, stevia, ginger, propolis, *echinacea*, St. John's Wort, Siberian ginseng, guarana, and garlic in the form of drugs, extracts or in purified form.

Furthermore, it is possible by means of the present invention to add substances, which cannot resist the thermal and mechanical influences that normally occur during the manufacturing of cores of chewing gum, such substances being certain vitamins, enzymes, and pharmaceuticals.

The active substance(s) is/are added in the form of dry active substance, preferably spray-dried active substance, or in the form of encapsulated active substance. In a preferred embodiment of the present invention, the active substance is present in an encapsulated form. The active substance is preferably present in the form of a powder with particles having a size of 3–300 μm.

The use of encapsulated active substance provides a larger stability of the substance, and the active substance migrates very slowly to the surface of the coated chewing gum. Furthermore, the contact of the encapsulated active substances with the air is limited, whereby possible oxidation processes take place very slowly. The latter are of particular significance in connection with flavours, especially in the form of ethereal oils, such as peppermint, lemon, lime, and orange.

In addition, by encapsulating the active substance, it is achieved that its reaction with other substances is prevented, substances like e.g. sodium bicarbonate with acid and aspartame with aldehyde-containing flavours, and especially in case of substances with an unpleasant taste, e.g. certain pharmaceuticals, the taste may be camouflaged.

In addition, it has been found that by chewing chewing gum that is coated with encapsulated flavour, not only a strong taste explosion is achieved, but also an enhanced taste in all chewing phases. The latter is due to the fact that flavour capsules from the coating layer of the chewing gum are opened both during the initial chewing and in following chewing period.

Furthermore, using an encapsulated active substance may prevent a discoloration of the coating, e.g. plant extracts such as thyme or black pepper. Finally, it may be desirable to prevent water-solubility, e.g. in connection with the use of acids and salts as the active substance.

When an encapsulated active substance is used, conventionally used encapsulation agents are used as the encapsulation agent, for instance, but without limitation, fatty substances, waxes, gelatin, gum arabic, starch, cellulose, cellulose derivatives, shellac, polyvinyl acetate (PVA), polyethylene (PE), casein, zein, B cyclodextrine, silica, yeast cells, and a mixture of the above encapsulation agents. Preferred encapsulation agents comprise fatty substances such as hydrogenated soy bean, cottonseed, coconut, sunflower, palm kernel, rapeseed, and *ricinus* oil, or waxes such as bees' wax, candelilla wax, carnauba wax, paraffin wax, and polyethylene wax, etc. Especially preferred is the use of a mixture of hydrogenated rape oil and carnauba wax.

Encapsulated flavour and methods for encapsulation are known from, e.g., EP 0 170 752 A2, EP 0 453 397 A1, EP 0 455 598 B1, and U.S. Pat. No. 4,386,106.

In a particularly preferred embodiment of the coated chewing gum according to the present invention, the coating also comprises besides the coating material as well as one or more active substance(s) in solid form, one or more liquid active substance(s). This provides a larger flexibility of the process of chewing gum manufacture, and, when encapsulated active substance is concerned, a reduction in costs, since the encapsulation makes the process more expensive, and it is thus reserved for only the most sensitive active substances.

In one embodiment of the invention, the coating suspension comprises an aqueous solution of a sugar, a sugar alcohol, an artificial sweetener or mixtures thereof, preferably an aqueous solution of saccharose, dextrose, sorbitol, xylitol, tagatose, mannitol, maltitol, isomalt, aspartame, acesulfame K, saccharin, cyclamate, thalline, and neohespiridine.

The coating suspension is applied in approx. 2 to 90 increment(s), preferably in approx. 30–60 increments to achieve a uniform coating with a suitable thickness.

The active substance(s) is/are applied by sprinkling or by blowing the substances into the rotating kettles a number of times such as from 1 to 10 times between the dosages of the coating suspension, preferably approx. 1 to 4 times to achieve a suitable effect.

The following is a general description of the preparation of chewing gum.

Preparation of Chewing Gum

The preparation process comprises the following:

Mixing of conventional chewing gum components in kneading kettles (mixers) with strong horizontally placed Z-shaped arms, which processes the raw materials and produces a homogeneous gum mass.

The kneading kettles are heated to a temperature of 30–80° C., typically approx. 45° C. The mixing process starts with gum base quantities that have been weighed out, and the processing of these lasts for 1–20 minutes, typically approx. 10 minutes. Then one or more sweetener(s) in powder form or in liquid form is/are added. The dosage of sweeteners and the following processing last from 1 to 20 minutes, typically approx. 7 minutes.

Then the flavours and the remaining components are added and kneaded for a further 1 to 10 minutes, typically approx. 5 minutes. The admixture of flavours and the remaining components may also take place in the beginning of the kneading process, i.e. before the admixture of the sweeteners. It is also possible to add flavours in two or more portions during the kneading process.

When the kneading is completed, the kneading kettle is tipped, and the gum mass is taken out into carts, onto trays or the like.

The next process is the forming of the chewing gum. Before the forming can take place, the chewing gum mass, however, must be cooled. When taken out, the chewing gum mass has a temperature of 50–70° C., and in order to form the chewing gum, the temperature must be reduced to 30–45° C. The cooling of the chewing gum either takes place by storing the chewing gum mass in carts or on trays for quite a long time or by transporting a thin chewing gum carpet through a cooling tunnel.

The forming of the chewing gum may take place by extrusion through a specially formed nozzle, or the chewing gum may be formed after extrusion by means of rollers, punching machines, tentering wheels, and the like.

The chewing gum may be formed into cores, sticks, balls, cubes, cylinders, and many other shapes.

In order to prevent the chewing gum from sticking to the rollers and other tools, the chewing gum is frequently powdered with a powder, which may consist of i.a. icing sugar, talc, corn flour, and the like.

The formed chewing gum can be cooled immediately to room temperature in a cooling tunnel and be packed (especially in case of bubble gum and soft bubble gum), or the cooling may take place on trays at the store for semimanufactured products at a controlled temperature and moisture.

The formed and cooled chewing gum is then treated by means coating and polishing processes before the packing.

Coating and Polishing of Cores of Chewing Gum

The coating of cores takes place in tilted, round or horizontally placed cylindrical coating kettles that rotate during the whole process. The coating kettles are made from copper, stainless steel or fiberglass-reinforced polyester, and are often equipped with a piping system that supplies and exhausts air and doses the coating suspension.

The coating process may take place as follows:

Cores of chewing put into movement in rotating coating kettles are added to the coating suspension in small portions that disperse evenly over the surfaces of the cores after a short or long smoothing out time. (The smoothing out time is the period of time during which the suspension disperses over the cores, approx. 10–90 seconds, preferably approx. 30–60 seconds). Afterwards the cores are dried by means of air. The operation is repeated up to 90 times, preferably approx. 30–40 times, until the cores are completely covered and have the preferred measure and the preferred weight.

In order to ease the coating process of chewing gum, a suspension is used which is heated up to 90° C., preferable up to about 75° C., and air which is heated up to at least 35° C. such as about 40° C.

Between the dosages of the coating suspension, one or more active substances) in solid form is/are added in one or more increment(s) in order to provide the chewing gum with a fast effect, e.g. flavour release during the chewing. It is an important aspect of the invention that the drying period is extended to after applying the active substances. When the active substances are added just after the coating process is completed, the coating suspension is still soft and the active substances may be more or less embedded in the coating in the solid form. The skilled person will be able to estimate or to establish by a simple test when the active substance should be added for obtaining a sufficient adherence of the active ingredient to the coating.

As appears from the Examples, the drying period is 0 seconds, however, drying periods up to 50 seconds such as up to 25 seconds are within the present invention and even longer periods may be acceptable depending on the drying properties of the coating suspension, the particle size of the active substance as well as whether it is desired that the active substance should be fully embedded in the coating or should form a superficial layer on the coating.

Furthermore, between the dosages of the coating suspension and the addition of one or more active substance(s) in solid form, one or more active substance(s) in liquid form may be added.

In order to achieve a neat and smooth surface of the chewing gum tablets with the completed coating, these may subsequently be subjected to a polishing. The polishing also takes place in rotating coating kettles in which a polishing suspension or a polishing powder is added to the coated cores in one or more portion(s). The polishing suspension often consists of wax, emulsifier, shellac, gum arabic, water, etc. The polishing powder often consists of wax only, or of wax mixed with emulsifier, gum arabic or talc, etc.

The present invention is further illustrated below by means of some examples.

EXAMPLES

As a starting point, partly sugar-containing, partly sugar-free cores of chewing gum are used which are rolled out into sheets by means of stamping rollers, i.e. coherent sheets of cores of chewing gum which have a weight of approx. 0.9 g/piece.

A coating kettle DRIA 1200, supplied by Driam Metallprodukt GmbH, Germany, is used for the coating of the above-mentioned cores. DRIA 1200 is a horizontally placed and cylindrical kettle intended for the coating of 50 kg of chewing gum cores. The equipment has computer controlling of the amount of dosages of liquid and solid substances as well as controlling of the smoothing out times, the drying times, air quantities, the temperature of the drying air, and the airflow direction. For dosage of an active substance in a solid form, a pneumatic conveyor having a dispersing arm which ensures an even dispersion of the powder over all the tablets. The coating kettle can be set at various velocities from 1 to 15 rpm.

During the coating process, 50 kg of chewing gum cores are filled into the coating kettle that can be set to a rotation of 8 rpm. During this rotation, the cores of chewing gum are separated from each other. Drying air is applied to the equipment, and surplus talc, which has been added during the rolling out of the cores of chewing gum, is removed. This separation and blowing through of air last for approx. 5 minutes.

Then the rotation speed of the coating kettle is increased to 11 rpm, and the first dosage of the coating suspension may take place.

It is also possible to use small (2 kg) or large (100 kg) tilted, round coating kettles and sprinkle active substance in solid form manually in 1–10 increment(s) between the dosages of the coating suspension. Dosage of active substance in more increments ensures an even dispersion of the powder over all the cores of chewing gum.

For the coating of sugar-containing cores of chewing gum, a saccharose suspension was used in the following examples, and a sorbitol suspension was used for the coating of sugar-free cores.

In the following embodiments, the coating suspension had the following composition:

| 1. Saccharose suspension | |
|---|---|
| Sugar juice (70%) | 94.45% |
| Water | 4.68% |
| Gelatine (Bloom value 120–160) | 0.87% |
| Total | 100.00% |
| 2. Sorbitol suspension | |
| Sorbitol liquid/neosorb 70/02 | 97.86% |
| Water | 1.59% |
| Titanium dioxide | 0.55% |
| Total | 100.00% |

The Examples 1, 2, and 3, shows conventional coating of sugar-containing and sugar-free cores of chewing gum, respectively.

Example 1

| Coating in DRIA 1200 equipment of 50 kg of sugar-containing chewing gum cores with peppermint taste. | | | | |
|---|---|---|---|---|
| Saccharose suspension Dosage No. | Amount of dosage g | Smoothing out time sec. | Drying time sec. | Drum rpm |
| 1–2 | 500 | 45 | 300 | 11 |
| 3–12 | 900 | 45 | 400 | 11 |
| 13 | 600 + 222* | 60 | 400 | 11 |
| 14–15 | 700 | 0 | 380 | 11 |
| 16–21 | 1000 | 0 | 380 | 11 |
| 22–34 | 1000 | 30 | 410 | 11 |
| 35–38 | 600 | 260 | 280 | 11 |
| 39 | 500 | 1500 | 290 | 11 |
| 40 | wax powder 50 g | 300 | 300 | 8 |

*A 600 g saccharose suspension + 222 g peppermint oil.

Example 2

| Coating in DRIA 1200 equipment of 50 kg of sugar-free chewing gum cores with peppermint taste. | | | | |
|---|---|---|---|---|
| Sorbitol suspension Dosage No. | Amount of dosage g | Smoothing out time sec. | Drying time sec. | Drum rpm |
| 1–2 | 400 | 0 | 250 | 11 |
| 3–5 | 700 | 15 | 300 | 11 |
| 6 | 700 + 200* | 60 | 300 | 11 |
| 7–16 | 700 | 45 | 300 | 11 |
| 17–24 | 1000 | 45 | 350 | 11 |
| 25–26 | 700 | 240 | 240 | 11 |
| 27 | wax powder 50 g | 360 | 360 | 8 |

*A 700 g sorbitol suspension + 200 g peppermint oil.

Example 3

| Coating in tilted kettles of 2 kg sugar-free chewing gum cores with a mixture of liquid eucalyptus, menthol, and anethol. | | | | |
|---|---|---|---|---|
| Sorbitol suspension Dosage No. | Amount of dosage g | Smoothing out time sec. | Drying time sec. | Number of revolutions rpm |
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20* | 60 | 120 | 50 |
| 13 | 9.9 liquid flavour | 10 | 0 | 50 |
| 14 | 20 | 40 | 0 | 50 |
| 15–16 | 20 | 5 | 120 | 50 |
| 17–22 | 30 | 60 | 120 | 50 |
| 23–26 | 40 | 30 | 120 | 50 |
| 27–33 | 30 | 60 | 120 | 50 |
| 34–35 | 20 | 120 | 240 | 50 |
| 36 | wax powder 2 g | 300 | 300 | 50 |

*A sorbitol suspension with 3.5% aspartame and 7.5% acesulfame K.

Example 4

Coating in DRIA 1200 equipment of 50 kg sugar-containing chewing gum cores with peppermint oil encapsulated in a 3:1 mixture of hydrogenated rape oil and carnauba wax.

| Saccharose suspension Dosage No. | Amount of dosage g | Smoothing out time sec. | Drying time sec. | Drum rpm |
|---|---|---|---|---|
| 1–2 | 500 | 45 | 300 | 11 |
| 3–12 | 900 | 45 | 400 | 11 |
| 13 | 400 | 10 | 0 | 11 |
| 14 | 400*powder | 60 | 0 | 11 |
| 15–16 | 700 | 0 | 380 | 11 |
| 17 | 400 | 10 | 0 | 11 |
| 18 | 400*powder | 60 | 0 | 11 |
| 19–20 | 700 | 0 | 380 | 11 |
| 21–24 | 1000 | 0 | 380 | 11 |
| 25–37 | 1000 | 30 | 410 | 11 |
| 38–41 | 700 | 260 | 280 | 11 |
| 42 | 500 | 1500 | 290 | 11 |
| 43 | wax powder 50 g | 300 | 300 | 8 |

*A powder with a flavour concentration of 28%.

Example 5

Coating in DRIA 1200 equipment of 50 kg sugar-free chewing gum cores with peppermint oil encapsulated in a 3:1 mixture of hydrogenated rape oil and carnauba wax.

| Sorbitol suspension Dosage No. | Amount of dosage g | Smoothing out time sec. | Drying time sec. | Drum rpm |
|---|---|---|---|---|
| 1–2 | 400 | 0 | 250 | 11 |
| 3–5 | 700 | 15 | 300 | 11 |
| 6 | 350 | 10 | 0 | 11 |
| 7 | 360*powder | 60 | 0 | 11 |
| 8–9 | 700 | 10 | 300 | 11 |
| 10 | 350 | 10 | 0 | 11 |
| 11 | 360*powder | 60 | 0 | 11 |
| 12–13 | 700 | 10 | 300 | 11 |
| 14–18 | 700 | 45 | 300 | 11 |
| 19–26 | 1000 | 45 | 350 | 11 |
| 27–28 | 700 | 240 | 240 | 11 |
| 29 | wax powder 50 g | 360 | 360 | 8 |

*A powder with a flavour concentration of 28%.

Example 6

Coating in tilted round kettles of 2 kg sugar-free chewing gum cores with peppermint oil encapsulated in silica.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20* | 60 | 120 | 50 |
| 13 | 20 | 10 | 0 | 50 |
| 14 | 17**powder | 40 | 0 | 50 |
| 15–16 | 20 | 5 | 120 | 50 |
| 17–19 | 30 | 60 | 120 | 50 |
| 20–28 | 40 | 30 | 120 | 50 |
| 29–33 | 30 | 60 | 120 | 50 |
| 34–35 | 20 | 120 | 240 | 50 |
| 36 | wax powder 2 g | 300 | 300 | 50 |

*A sorbitol suspension with 2.75% aspartame.
**A powder with a flavour concentration of 50%.

Example 7

Coating in tilted kettles of 2 kg sugar-free chewing gum cores with peppermint oil encapsulated in gelatine.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20* | 60 | 120 | 50 |
| 13 | 20 | 10 | 0 | 50 |
| 14 | 17**powder | 40 | 0 | 50 |
| 15–16 | 20 | 5 | 120 | 50 |
| 17–18 | 30 | 60 | 120 | 50 |
| 19 | 20 | 10 | 0 | 50 |
| 20 | 17**powder | 40 | 0 | 50 |
| 21–22 | 20 | 5 | 120 | 50 |
| 23–24 | 30 | 60 | 120 | 50 |
| 25–28 | 40 | 30 | 120 | 50 |
| 29–35 | 30 | 60 | 120 | 50 |
| 36–37 | 20 | 120 | 240 | 50 |
| 38 | wax powder 2 g | 300 | 300 | 50 |

*A sorbitol suspension with 2.75% aspartame.
**A powder with a flavour concentration of 25%.

Example 8

Coating in tilted kettles of 2 kg sugar-free chewing gum cores with a mixture of eucalyptus, menthol, and anethol, encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20* | 60 | 120 | 50 |
| 13 | 20 | 10 | 0 | 50 |
| 14 | 40**powder | 40 | 0 | 50 |
| 15–16 | 20 | 5 | 120 | 50 |
| 17–18 | 30 | 60 | 120 | 50 |

-continued

Coating in tilted kettles of 2 kg sugar-free chewing gum cores with a mixture of eucalyptus, menthol, and anethol, encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 19 | 20 | 10 | 0 | 50 |
| 20 | 40**powder | 40 | 0 | 50 |
| 21–22 | 20 | 5 | 120 | 50 |
| 23–24 | 30 | 60 | 120 | 50 |
| 25–28 | 40 | 30 | 120 | 50 |
| 29–35 | 30 | 60 | 120 | 50 |
| 36–37 | 20 | 120 | 240 | 50 |
| 38 | wax powder 2 g | 300 | 300 | 50 |

*A sorbitol suspension with 3.75% aspartame, and 7.5% acesulfame K.
**A powder with a flavour concentration of 24.5%.

Example 9

Coating in tilted kettles of 2 kg sugar-free chewing gum cores with a mixture of eucalyptus, menthol, and anethol, encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20* | 60 | 120 | 50 |
| 13 | 20 | 10 | 0 | 50 |
| 14 | 20**powder | 40 | 0 | 50 |
| 15–16 | 20 | 5 | 120 | 50 |
| 17–18 | 30 | 60 | 120 | 50 |
| 19 | 20 | 10 | 0 | 50 |
| 20 | 20**powder | 40 | 0 | 50 |
| 21–22 | 20 | 5 | 120 | 50 |
| 23–24 | 30 | 60 | 120 | 50 |
| 25–28 | 40 | 30 | 120 | 50 |
| 29–35 | 30 | 60 | 120 | 50 |
| 36–37 | 20 | 120 | 240 | 50 |
| 38 | wax powder 2 g | 300 | 300 | 50 |

*A sorbitol suspension with 3.5% aspartame and 7.5% acesulfame K.
**A powder with a flavour concentration of 24.5%.

Example 10

Coating in tilted kettles of 2 kg sugar-free chewing gum cores with a mixture of liquid eucalyptus, menthol, and anethol, as well as menthol encapsulated in gum arabic.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |

-continued

Coating in tilted kettles of 2 kg sugar-free chewing gum cores with a mixture of liquid eucalyptus, menthol, and anethol, as well as menthol encapsulated in gum arabic.

| Sorbitol suspension Dosage No. | Amount of dosage g | Smoothing out time sec. | Drying time sec. | Number of revolutions rpm |
|---|---|---|---|---|
| 12 | 20* | 60 | 120 | 50 |
| 13 | 9.9 liquid flavour | 10 | 0 | 50 |
| 14 | 20 | 40 | 0 | 50 |
| 15–16 | 20 | 5 | 120 | 50 |
| 17–18 | 30 | 60 | 120 | 50 |
| 19 | 20 | 10 | 0 | 50 |
| 20 | 7**powder | 40 | 0 | 50 |
| 21–22 | 20 | 5 | 120 | 50 |
| 23–24 | 30 | 60 | 120 | 50 |
| 25–28 | 40 | 30 | 120 | 50 |
| 29–35 | 30 | 60 | 120 | 50 |
| 36–37 | 20 | 120 | 240 | 50 |
| 38 | wax powder 2 g | 300 | 300 | 50 |

*A sorbitol suspension with 3.5% aspartame and 7.5% acesulfame K.
**A powder with a flavour concentration of 80%.

Example 11

Coating in tilted kettles of 2 kg sugar-free chewing gum cores with a mixture of liquid eucalyptus, menthol, anethol, as well as ammonium chloride encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20* | 60 | 120 | 50 |
| 13 | 9.9 liquid flavour | 10 | 0 | 50 |
| 14 | 20 | 40 | 0 | 50 |
| 15 | 20 | 5 | 120 | 50 |
| 16–17 | 30 | 60 | 120 | 50 |
| 18 | 20 | 10 | 0 | 50 |
| 19 | 40**powder | 40 | 0 | 50 |
| 20–21 | 20 | 5 | 120 | 50 |
| 22 | 20 | 10 | 0 | 50 |
| 23 | 40**powder | 40 | 0 | 50 |
| 24–25 | 20 | 5 | 120 | 50 |
| 26–27 | 30 | 60 | 120 | 50 |
| 28–30 | 40 | 30 | 120 | 50 |
| 31–37 | 30 | 60 | 120 | 50 |
| 38–39 | 20 | 120 | 240 | 50 |
| 40 | wax powder 2 g | 300 | 300 | 50 |

*A sorbitol suspension with 3.5% aspartame and 7.5% acesulfame K.
**A powder with a ammonium chloride concentration of 30%.

Example 12

Coating in tilted kettles of 2 kg sugar-free chewing gum cores with a mixture of liquid eucalyptus, menthol, and powdered anise, as well as naturally extract of black pepper encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20 | 60 | 120 | 50 |
| 13 | 20 | 10 | 0 | 50 |
| 14 | 20*powder | 40 | 0 | 50 |
| 15–16 | 20 | 5 | 120 | 50 |
| 17–18 | 30 | 60 | 120 | 50 |
| 19 | 10 liquid flavour | 10 | 0 | 50 |
| 20 | 20 | 40 | 0 | 50 |
| 21–22 | 20 | 5 | 120 | 50 |
| 23–24 | 30 | 60 | 120 | 50 |
| 25–28 | 40 | 30 | 120 | 50 |
| 29–35 | 30 | 60 | 120 | 50 |
| 36–37 | 20 | 120 | 240 | 50 |
| 38 | wax powder 2 g | 300 | 300 | 50 |

*A powder of naturally extract of black pepper in a concentration of 20%.

Example 13

Coating in tilted kettles of 2 kg sugar-free chewing gum cores with a mixture of liquid eucalyptus, menthol, and powered anise as well as naturally basil extract encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20 | 60 | 120 | 50 |
| 13 | 20 | 10 | 0 | 50 |
| 14 | 20*powder | 40 | 0 | 50 |
| 15–16 | 20 | 5 | 120 | 50 |
| 17–18 | 30 | 60 | 120 | 50 |
| 19 | 10 liquid flavour | 10 | 0 | 50 |
| 20 | 20 | 40 | 0 | 50 |
| 21–22 | 20 | 5 | 120 | 50 |
| 23–24 | 30 | 60 | 120 | 50 |
| 25–28 | 40 | 30 | 120 | 50 |
| 29–35 | 30 | 60 | 120 | 50 |
| 36–37 | 20 | 120 | 240 | 50 |
| 38 | wax powder 2 g | 300 | 300 | 50 |

*A powder of naturally basil extract in a concentration of 14%.

Example 14

Coating in tilted kettles of 2 kg sugar-free chewing gum cores with a mixture of liquid eucalyptus, menthol, and powdered anise, as well as naturally thyme extract encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20 | 60 | 120 | 50 |
| 13 | 20 | 10 | 0 | 50 |
| 14 | 20*powder | 40 | 0 | 50 |
| 15–16 | 20 | 5 | 120 | 50 |
| 17–18 | 30 | 60 | 120 | 50 |
| 19 | 10 liquid flavour | 10 | 0 | 50 |
| 20 | 20 | 40 | 0 | 50 |
| 21–22 | 20 | 5 | 120 | 50 |
| 23–24 | 30 | 60 | 120 | 50 |
| 25–28 | 40 | 30 | 120 | 50 |
| 29–35 | 30 | 60 | 120 | 50 |
| 36–37 | 20 | 120 | 240 | 50 |
| 38 | wax powder 2 g | 300 | 300 | 50 |

*A powder of naturally thyme extract in a concentration of 15%.

Example 15

Coating in tilted kettles of 2 kg sugar-free chewing gum cores with a mixture of mixture of liquid fruit flavours (orange, lemon, and mango) as well as citric acid encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20* | 60 | 120 | 50 |
| 13 | 20 | 10 | 0 | 50 |
| 14 | 30**powder | 40 | 0 | 50 |
| 15–16 | 20 | 5 | 120 | 50 |
| 17 | 20 | 10 | 0 | 50 |
| 18 | 30**powder | 40 | 0 | 50 |
| 19–20 | 20 | 5 | 120 | 50 |
| 21 | 5.7 liquid flavour | 10 | 0 | 50 |
| 22 | 20 | 40 | 0 | 50 |
| 23–24 | 20 | 5 | 120 | 50 |
| 25–26 | 30 | 60 | 120 | 50 |
| 27–30 | 40 | 30 | 120 | 50 |
| 31–37 | 30 | 60 | 120 | 50 |
| 39–40 | 20 | 120 | 240 | 50 |
| 41 | wax powder 2 g | 300 | 300 | 50 |

*A sorbitol suspension with 7.5% aspartame.
**Encapsulated citric acid in a concentration of 35%.

Example 16

Coating in tilted kettles of 2 kg sugar-free chewing gum cores with a mixture of liquid fruit flavours (orange, lemon, and mango) as well as ascorbic acid encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20* | 60 | 120 | 50 |
| 13 | 20 | 10 | 0 | 50 |
| 14 | 30**powder | 40 | 0 | 50 |
| 15–16 | 20 | 5 | 120 | 50 |
| 17 | 20 | 10 | 0 | 50 |
| 18 | 30**powder | 40 | 0 | 50 |
| 19–20 | 20 | 5 | 120 | 50 |
| 21 | 5.7 liquid flavour | 10 | 0 | 50 |
| 22 | 20 | 40 | 0 | 50 |
| 23–24 | 20 | 5 | 120 | 50 |
| 25–26 | 30 | 60 | 120 | 50 |
| 27–30 | 40 | 30 | 120 | 50 |
| 31–37 | 30 | 60 | 120 | 50 |
| 39–40 | 20 | 120 | 240 | 50 |
| 41 | wax powder 2 g | 300 | 300 | 50 |

*A sorbitol suspension with 7.5% aspartame.
**Encapsulated ascorbic acid in a concentration of 60%.

Example 17

Coating in tilted kettles of 2 kg sugar-free chewing gum cores with a mixture of mixture of liquid fruit flavours (orange, lemon, and mango) as well as cooling agent encapsulated in gum arabic.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20* | 60 | 120 | 50 |
| 13 | 20 | 10 | 0 | 50 |
| 14 | 20**powder | 40 | 0 | 50 |
| 15–16 | 20 | 5 | 120 | 50 |
| 17 | 20 | 10 | 0 | 50 |
| 18 | 20 | 40 | 0 | 50 |
| 19–20 | 20 | 5 | 120 | 50 |
| 21 | 5.7 liquid flavour | 10 | 0 | 50 |
| 22 | 20 | 40 | 0 | 50 |
| 23–24 | 20 | 5 | 120 | 50 |
| 25–26 | 30 | 60 | 120 | 50 |
| 27–30 | 40 | 30 | 120 | 50 |
| 31–37 | 30 | 60 | 120 | 50 |
| 39–40 | 20 | 120 | 240 | 50 |
| 41 | wax powder 2 g | 300 | 300 | 50 |

*A sorbitol suspension with 7.5% aspartame.
**Encapsulated cooling agent, "Cooling Flavouring Powder" from International Flavours and Fragrances, Ltd., England, in a concentration of 20%.

Example 18

Coating in tilted kettles of 2 kg sugar-free chewing gum cores with a mixture of liquid flavours (apple and cinnamon) as well as aspartame encapsulated in a 3:1 mixture of hydrogenated rape oil and carnauba wax.

| Sorbitol suspension Dosage No. | Amount of dosage g | Smoothing out time sec. | Drying time sec. | Number of revolutions rpm |
|---|---|---|---|---|
| 1 | 20 | 120 | 120 | 50 |
| 2 | 20 | 90 | 120 | 50 |
| 3 | 20 | 60 | 60 | 50 |
| 4–9 | 30 | 30 | 90 | 50 |
| 10–11 | 30 | 30 | 120 | 50 |
| 12 | 20 | 60 | 120 | 50 |
| 13 | 20 | 10 | 0 | 50 |
| 14 | 25*powder | 40 | 0 | 50 |
| 15–16 | 20 | 5 | 120 | 50 |
| 17–18 | 30 | 60 | 120 | 50 |
| 19 | 6.6 liquid flavour | 10 | 0 | 50 |
| 20 | 20 | 10 | 0 | 50 |
| 21–22 | 20 | 40 | 120 | 50 |
| 23–24 | 30 | 5 | 120 | 50 |
| 25–28 | 30 | 30 | 120 | 50 |
| 29–35 | 20 | 60 | 120 | 50 |
| 36–37 | 30 | 120 | 240 | 50 |
| 38 | wax powder 2 g | 300 | 300 | 50 |

*Encapsulated aspartame in a concentration of 10%.

Test Results

A number of sensory tests were carried out as documentation of the achieved effect by the use of active substances in solid form in the coating of a coated chewing gum.

The tests were carried out with 5 to 8 trained tasters per test. The coated chewing gum was served in tasteless plastic cups coded with a randomised three-figure number. There was a 3-minute-break between each product tested, and each product was tested twice.

The tests were carried out partly in the form of a measurement of the flavour release as a function of time (time intensity tests), in which the products were tested after 5, 15, 30, 45, 60, 75, 90, 105, 120, 135, 150, 165, 180, 240, 300, 420, and 540 seconds, partly in the form of determination of a taste profile, in which the products were tested in intervals; the initial phase: 0–1 minute, the intermediate phase 1–3 minute(s), and the end phase 3–4 minutes.

Test 1

A measurement was carried out of the flavour release as a function of time from a chewing gum coated according to Example 8, i.e. with a mixture of eucalyptus, menthol, and anethol encapsulated in fat and wax. The flavour release from this chewing gum was compared with a chewing gum coated according to Example 3, i.e. with liquid eucalyptus, menthol, and anethol. The result of the test appears from FIG. 1 which shows that the use of encapsulated flavour in the coating layer partly results in an extremely high taste onset (taste explosion) during the first 60 seconds, and partly enhances the taste in all chewing phases.

Test 2

Figure 2:
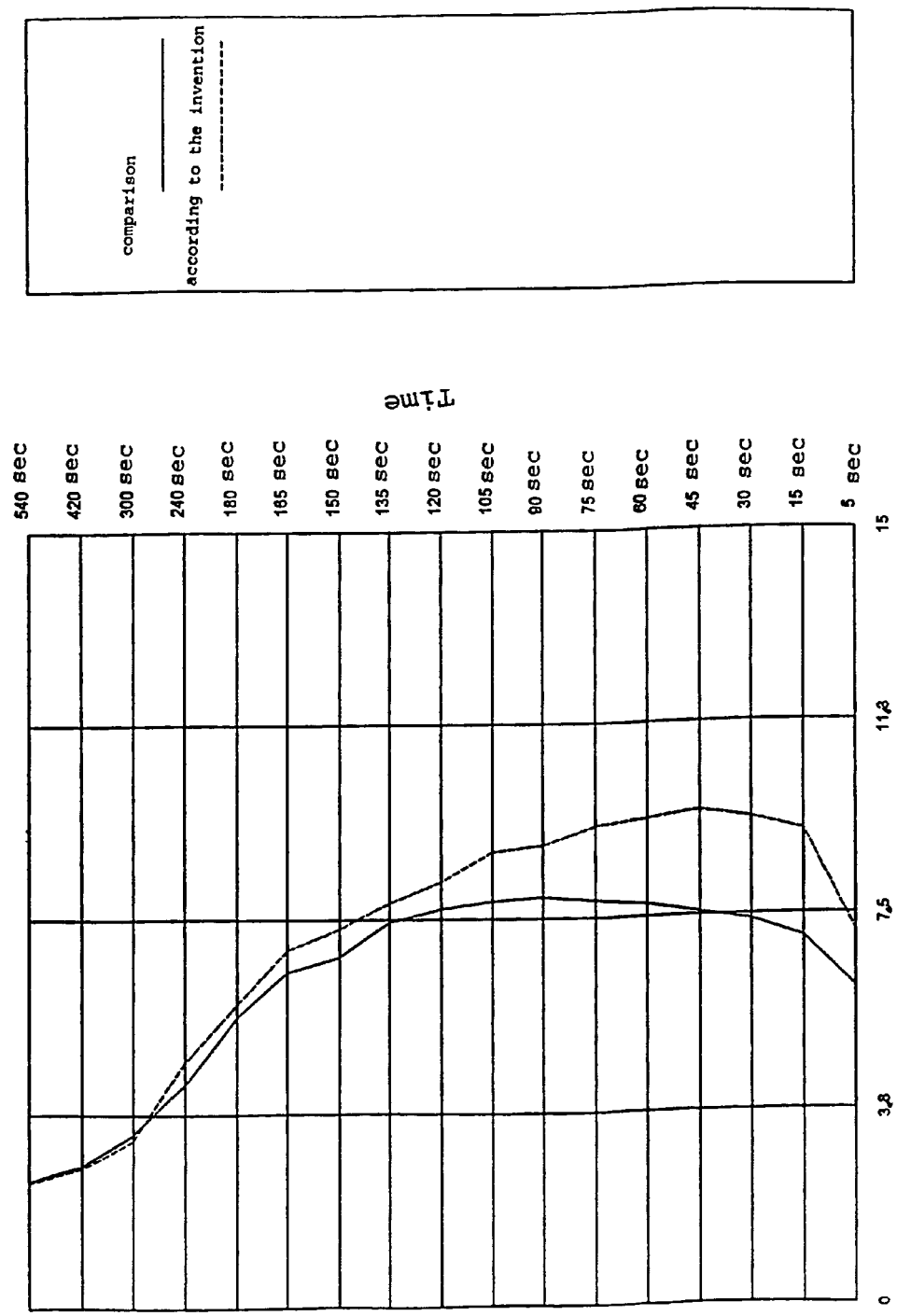
FIG. 2 shows the release of flavour as a function of time by using the same amount of eucalyptus/anethol/menthol flavour in encapsulated form and liquid form, respectively.

In this test, measurement of the flavour release as a function of time by the use of the same amount of eucalyptus/menthol/anethol flavour in liquid form (Example 3) and encapsulated in fat and wax (Example 9), respectively, was carried out. The result of the test appears from FIG. 2, which shows that the use of active substance in solid form provides a strong taste explosion in the initial phase, and a significantly enhanced effect in the first 4–5 minutes can be observed.

Test 3

In this test, the effect of addition of menthol encapsulated in gum arabic to the coating of a chewing gum coated with liquid eucalyptus, menthol, and anethol, cf. Example 10, was examined and compared with a chewing gum coated according to Example 3, i.e. only with liquid eucalyptus, menthol, and anethol.

Figure 3:
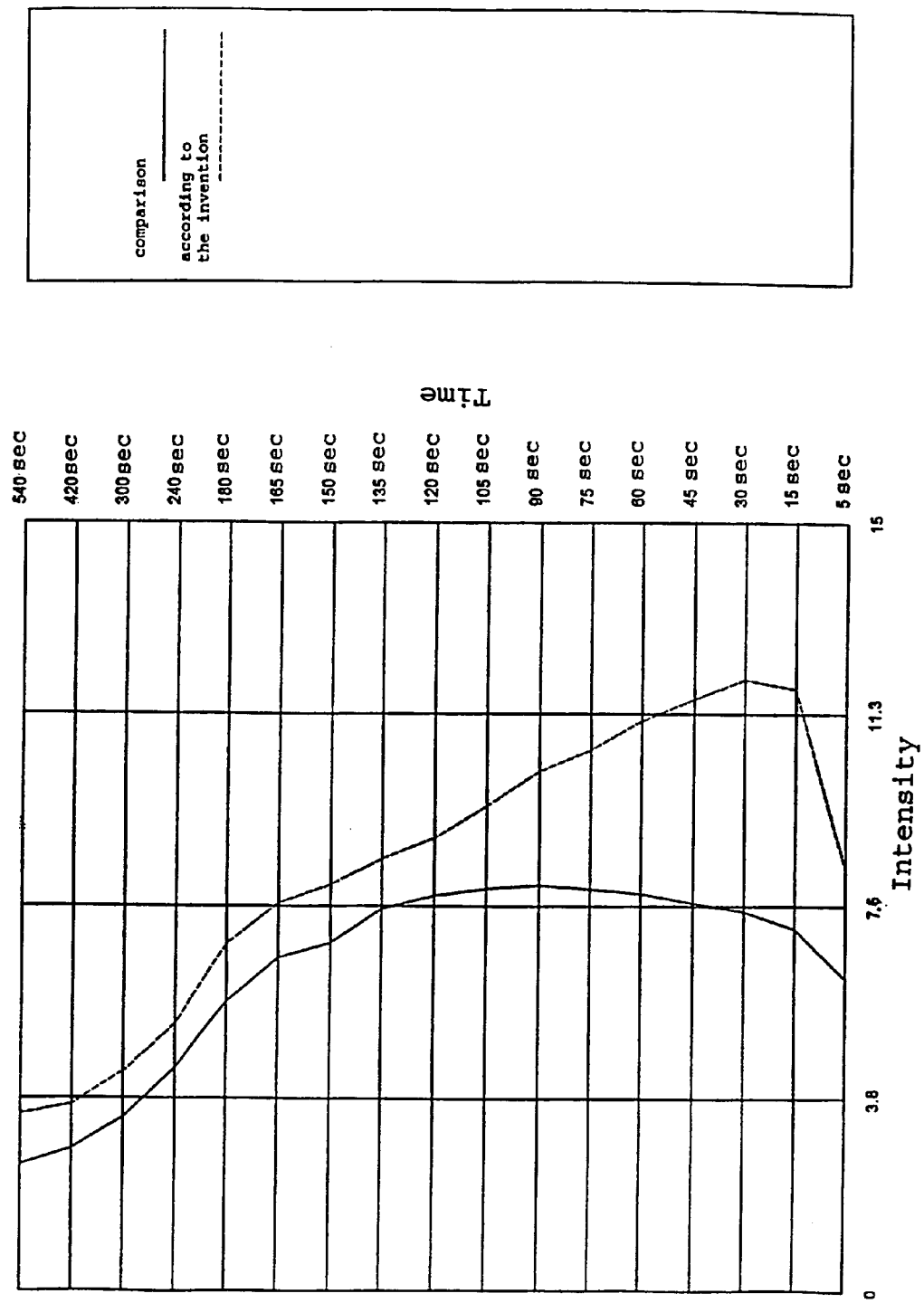
FIG. 3 shows the release of flavour as a function of time by using liquid eucalyptus/anethol/menthol flavour and with and without encapsulated menthol.

The result of the test is shown in FIG. 3 which shows that addition of encapsulated menthol causes a strong taste explosion in the initial phase and an enhanced taste effect in all the chewing phases.

Test 4

A stability test was carried out of a chewing gum coated in accordance with Example 18, i.e. coated with apple/cinnamon flavour as well as aspartame encapsulated in fat and wax. By way of comparison, a corresponding chewing gum in which the aspartame was non-encapsulated was tested.

Figure 4:
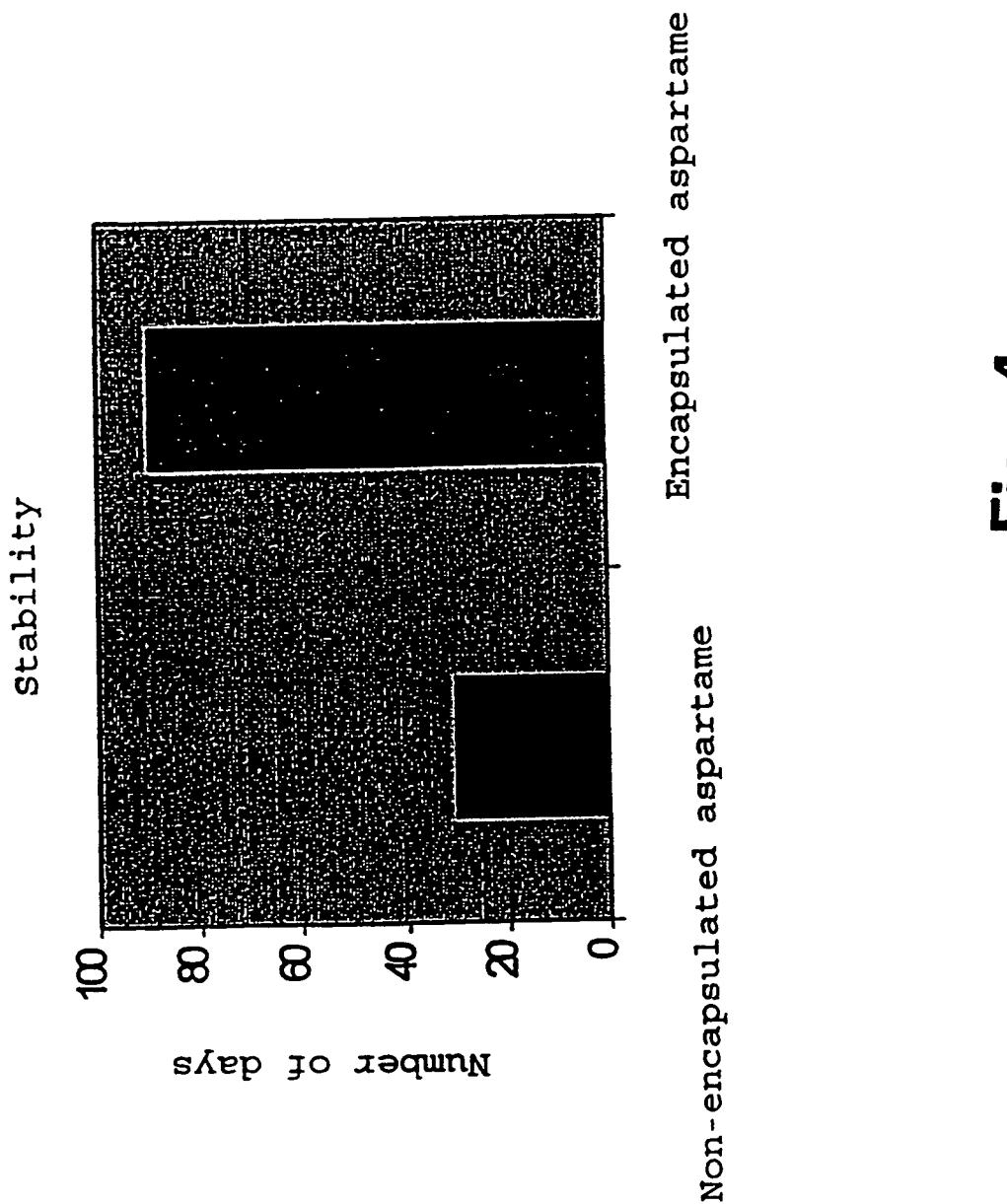
FIG. 4 shows the stability of chewing gum with apple/cinnamon flavour with encapsulated and non-encapsulated aspartame, respectively, in suspension form in the coating.

The result of the test is shown in FIG. 4 which shows that the chewing gum containing non-encapsulated aspartame loses its stability already after approx. 30 days after coating since it develops a bitter taste. The lack of stability is probably due to a reaction between aspartame and aldehyde-containing flavours. In a corresponding chewing gum with encapsulated aspartame in the coating no change in the taste is observed even after 90 days.

Thus, encapsulation of aspartame has a strong stability-improving effect

Test 5

Figure 5:
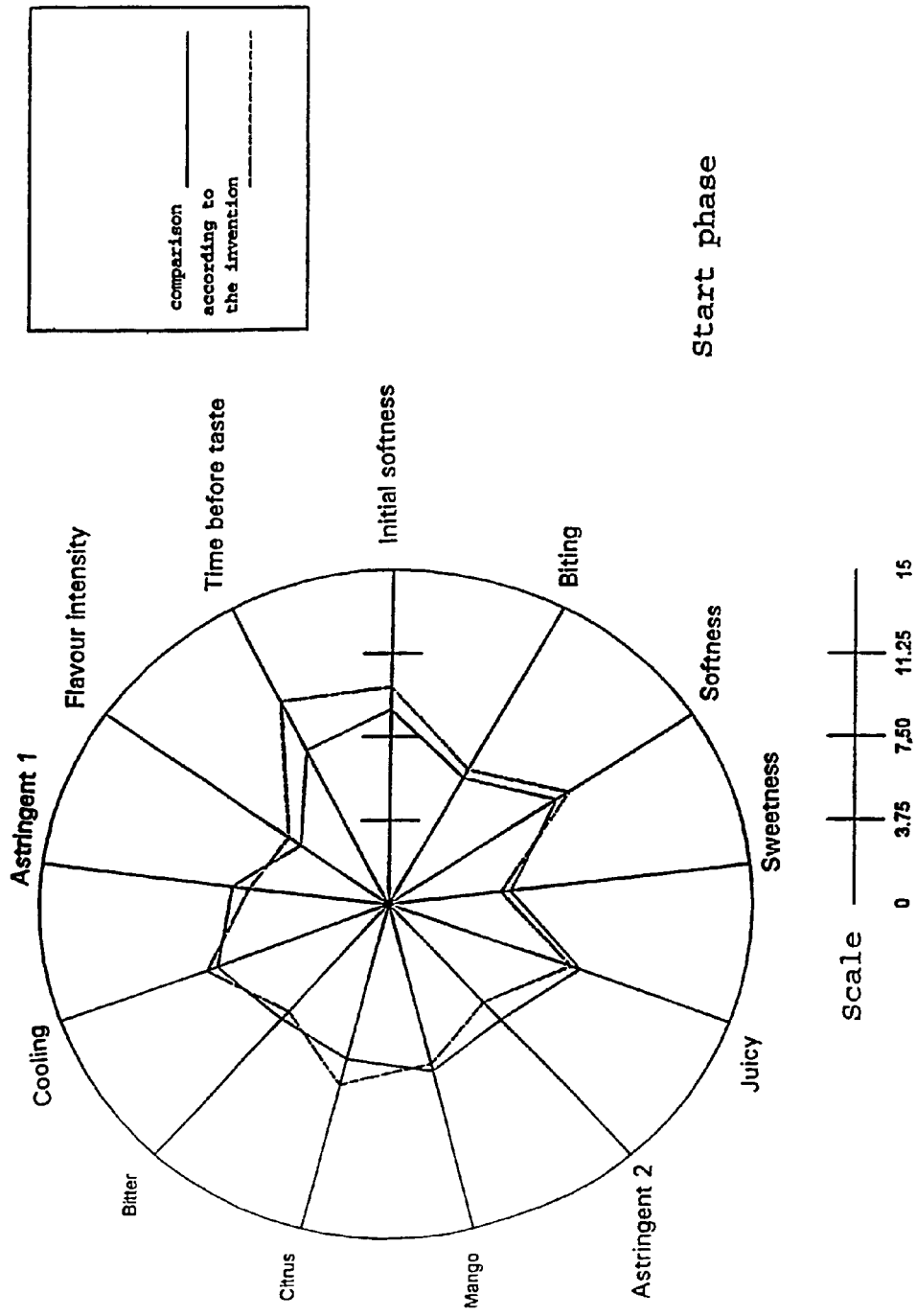
FIG. 5 shows a flavour profile in the initial phase of chewing gum with fruit flavour (lemon/orange/mango) with and without encapsulated citric acid in the coating.

A test was carried out with chewing gum coated according to Example 15, i.e. with a mixture of liquid fruit flavours (orange, lemon, and mango) as well as citric acid encapsulated in fat and wax in order to determine the taste profile in the initial phase. By way of comparison, a taste profile was recorded for a corresponding chewing gum coated with the same fruit flavours (orange, lemon, and mango), but without encapsulated citric acid in the coating layer. The result of the test is shown in FIG. 5.

As will be apparent, a chewing gum with citric acid has a larger taste intensity and stronger citric notes than a corresponding product without citric acid.

Test 6

Figure 6:
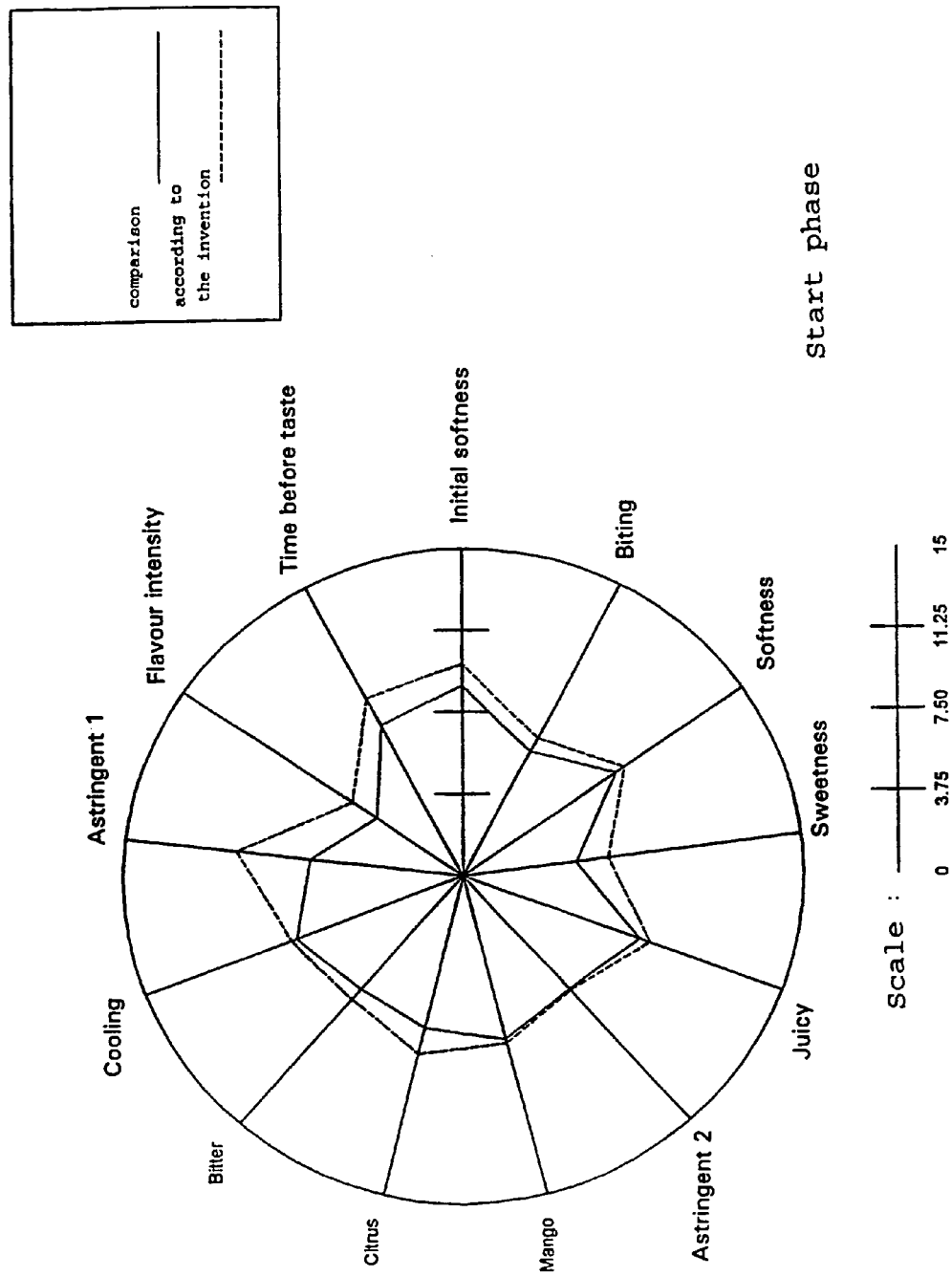
FIG. 6 shows a flavour profile in the initial phase of a chewing gum with fruit flavour (lemon/orange/mango) with and without encapsulated "cooling agent" in the coating.
Figure 7:
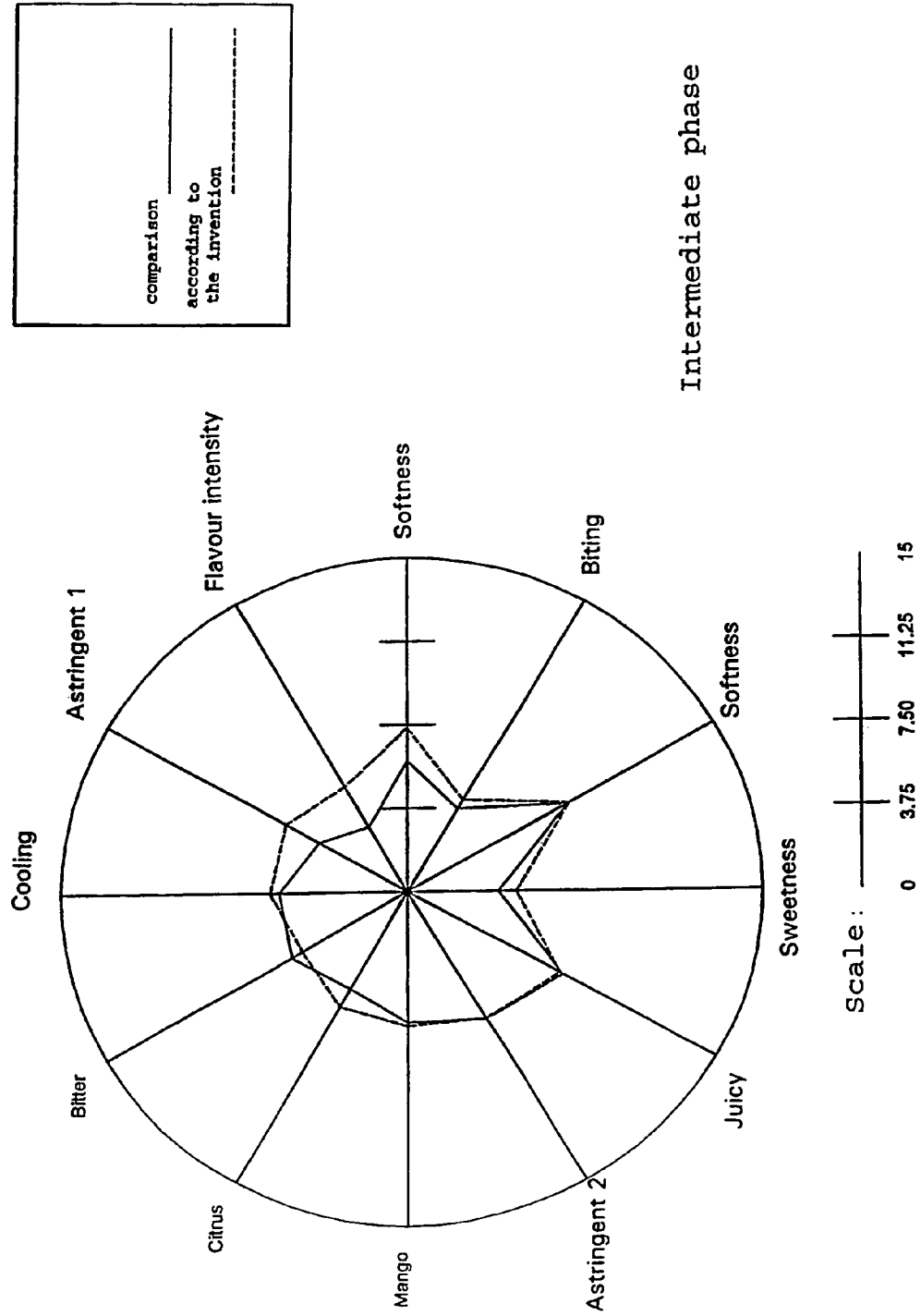
FIG. 7 shows the same in the intermediate phase.
Figure 8:
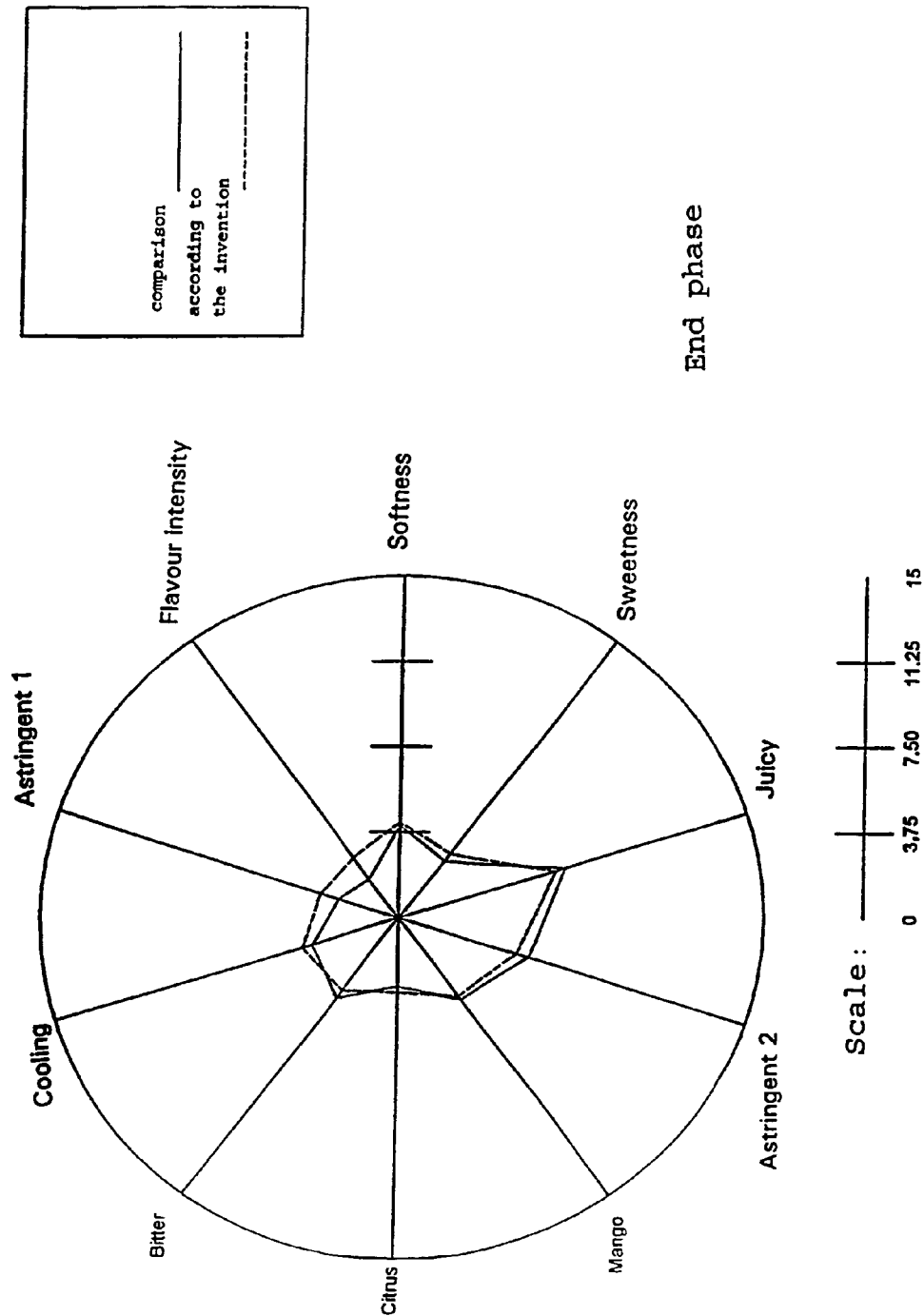
FIG. 8 shows the same in the end phase.
Figure 9:
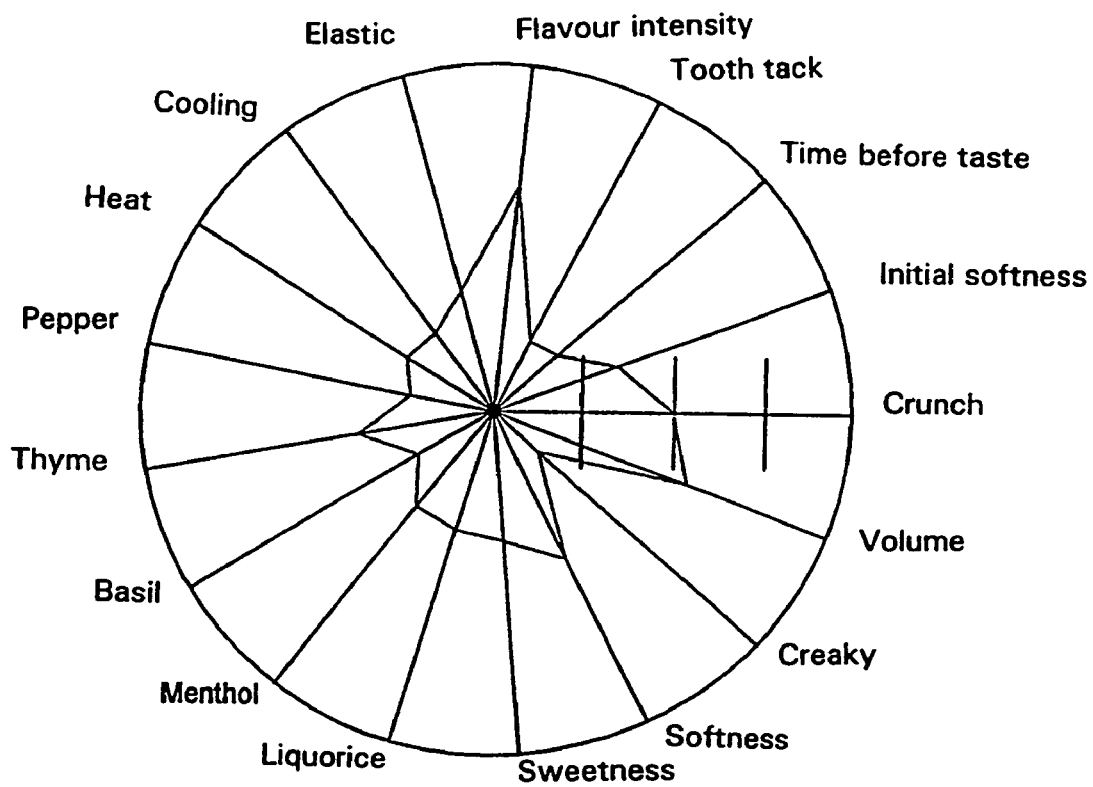
FIG. 9 shows a flavour profile in the initial phase of chewing gum with menthol/anethol/eucalyptus flavour and with encapsulated thyme extract in the coating.
Figure 10:
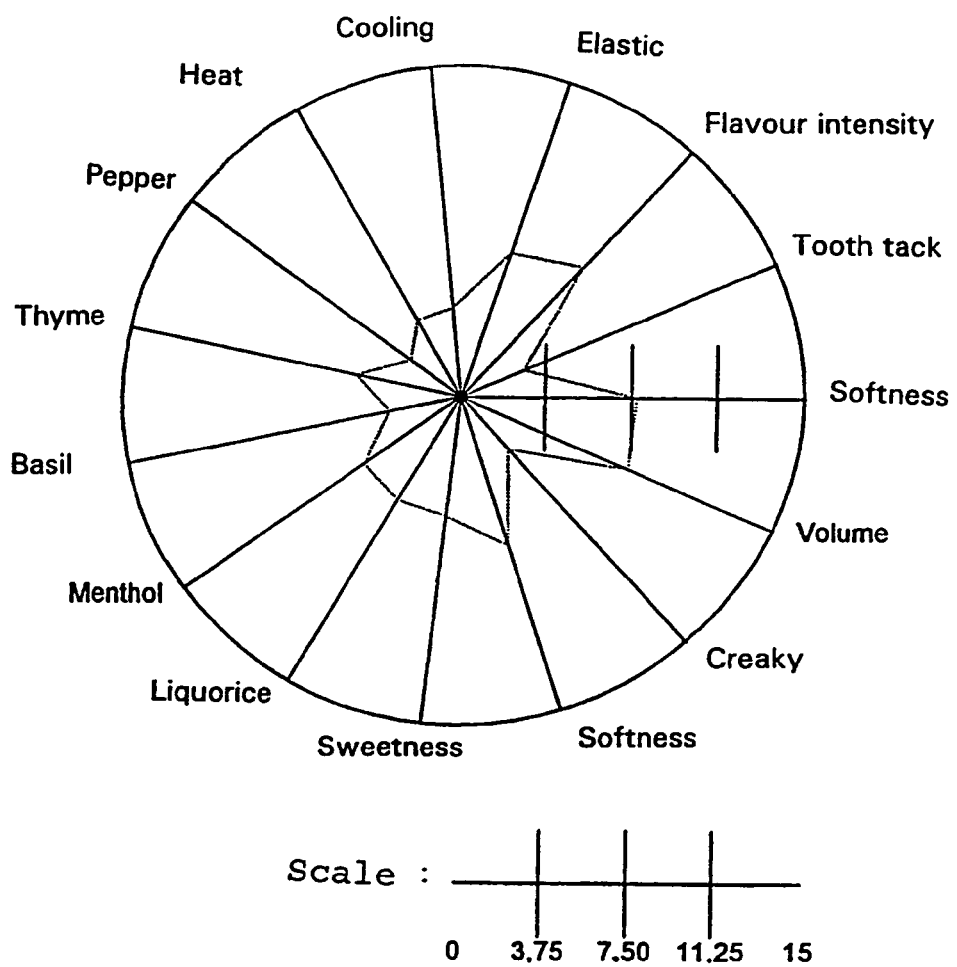
FIG. 10 shows the same in the intermediate phase.
Figure 11:
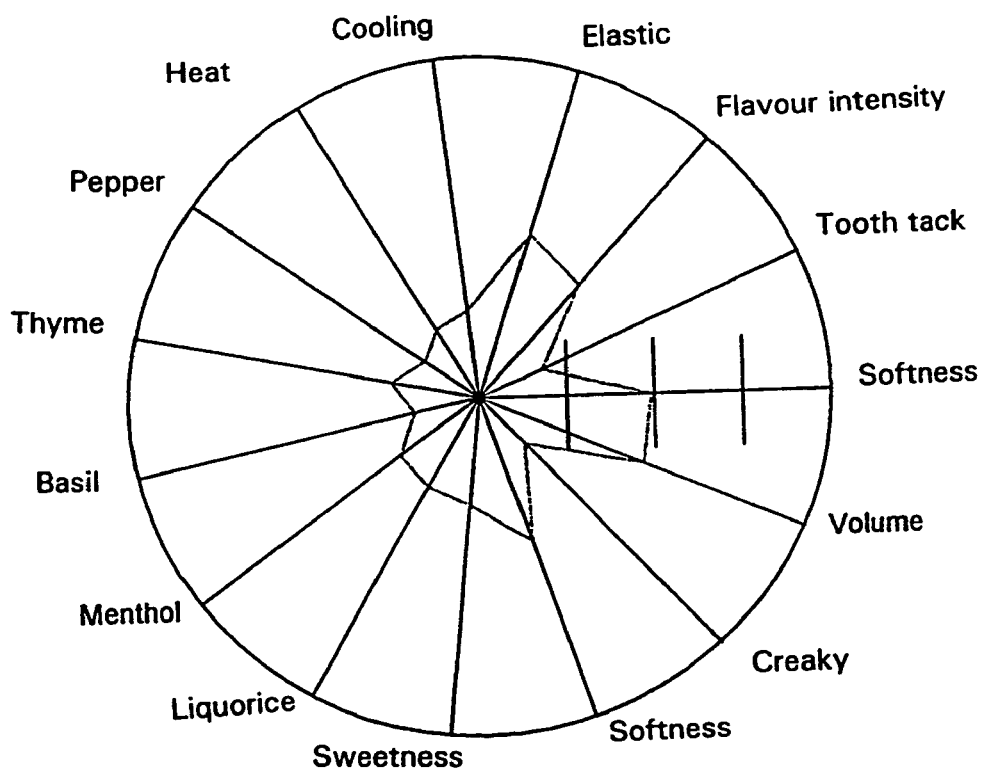
FIG. 11 shows the same in the end phase.
Figure 11:

A test was carried out in order to determine the taste profile in the initial phase, the intermediate phase, and the end phase, respectively, of a chewing gum coated according to Example 17, i.e. with a mixture of liquid fruit flavours (orange, lemon, and mango) and with and without cooling flavour encapsulated in gum arabic. The result of the test is shown in FIGS. 6, 7, and 8 which show that the chewing gum with the cooling agent has a larger taste intensity and stronger citric notes in the initial phase. As is apparent from FIGS. 7 and 8, this tendency is maintained in the intermediate phase and in the end phase as well in spite of the fact that the cooling agent was placed in the coating layer only.

Thus, the chewing gum according to the invention shows an increased effect of the active substance in all the chewing phases.

Test 7

In this test the taste profile of a chewing gum coated according to Example 14, i.e. with a mixture of liquid eucalyptus, menthol, and powdered anise as well as natural thyme extract encapsulated in fat and wax, was determined.

The use of encapsulated thyme provides the possibility of developing a chewing gum with an entirely new combination of tastes without having to observe the occurrence of discoloration of the coating layer by the use of liquid extract.

Test 8

Figure 12:
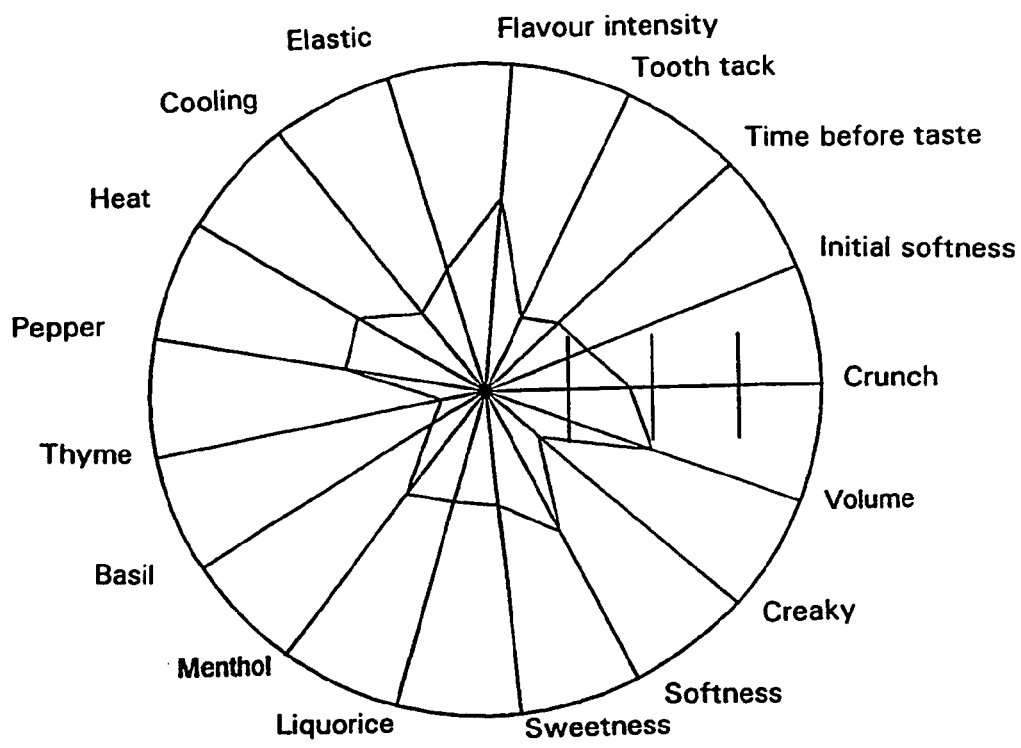
FIG. 12 shows a flavour profile in the initial phase of chewing gum with menthol/anethol/eucalyptus flavour and with encapsulated extract of black pepper in the coating.
Figure 13:
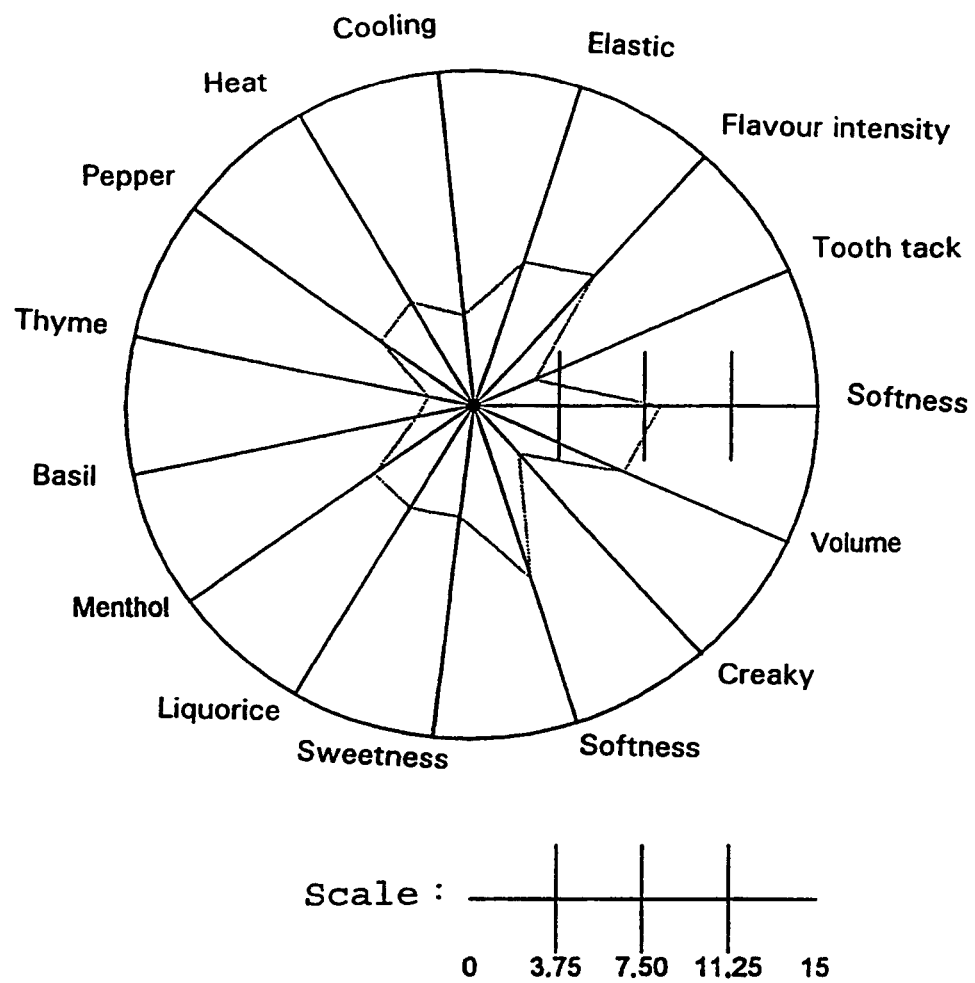
FIG. 13 shows the same in the intermediate phase.
Figure 14:
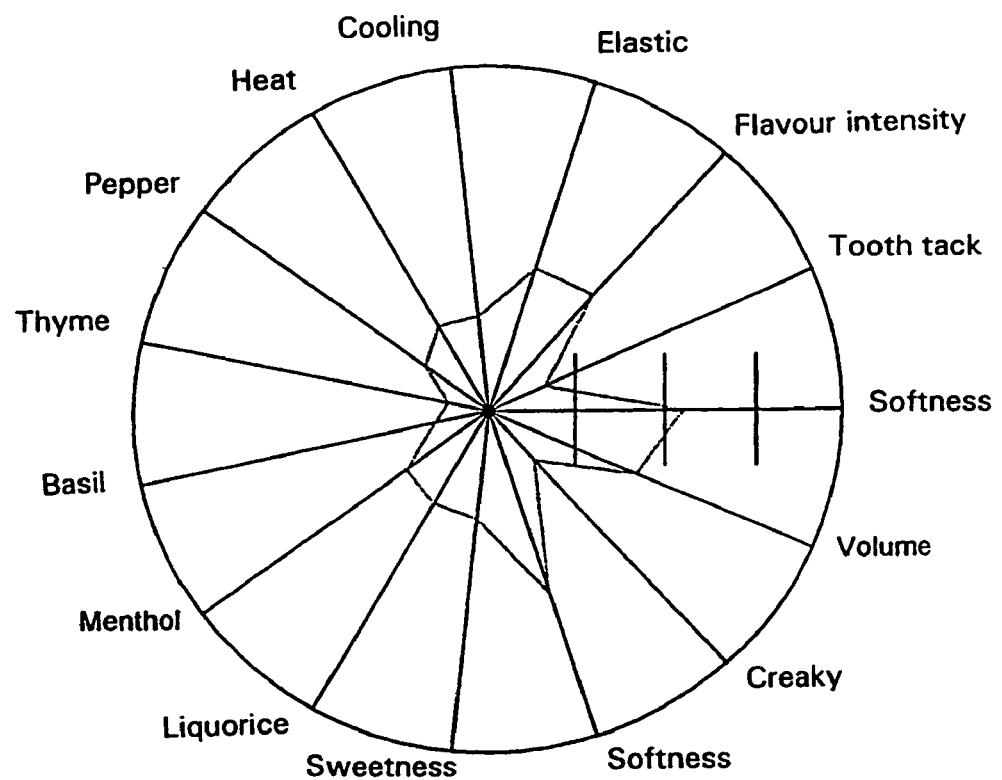
FIG. 14 shows the same in the end phase.

In this test the taste profile of a chewing gum coated according to Example 12, i.e. with a mixture of liquid eucalyptus, menthol, and powdered anise as well as natural extract of black pepper encapsulated in fat and wax, was determined. The result of this test is shown in FIGS. 12, 13, and 14. In the same way as in test 7, the possibility of creating new combinations of tastes without discoloration of the coating layer is achieved.

The invention being thus described, it will be obvious that it may be varied in many ways. Such variations are not to be regarded as deviations from the idea and the scope of the invention, and all such modifications as would be obvious to persons skilled in the art, are intended to be included within the scope of the following claims.

The invention claimed is:

1. A coated chewing gum comprising a core of chewing gum and a coating, wherein said coating comprises one or more coating materials and one or more flavor(s), said flavor(s) being in the form of a powder when applied to the coating and at least one flavor is a natural vegetable flavoring agent comprising intact cells of a dried fruit or herb.

2. A method of preparing a coated chewing gum, the method comprising the following steps:
   1) providing a core of chewing gum, a coating suspension, and at least one natural vegetable flavoring agent in the form of a dry powder, where said natural vegetable flavoring agent is a powder of a dried fruit or a dried herb,
   2) applying the coating suspension onto the core of chewing gum,
   3) applying, in one or more increment(s), said at least one natural vegetable flavoring agent onto the coated cores of chewing gum resulting from step 2) said agent being and remaining in the form of a powder throughout said applying step, and optionally repeating steps 2) and 3).

3. The method according to claim 2, wherein the at least one natural vegetable flavoring agent has a water content of less than 75% by weight.

4. The method according to claim 2, wherein the water content of the at least one natural vegetable flavoring agent is less than 15% by weight.

5. The method according to claim 2, wherein the at least one natural vegetable flavoring agent was extracted from one or more vegetables each selected from the group consisting of a coconut, a grape fruit, an orange, a lime, a lemon, a mandarin, a pineapple, a strawberry, a raspberry, a mango, a passion fruit, a kiwi, an apple, a pear, a peach, an apricot, a cherry, a grape, a banana, a cranberry, a blueberry, a black currant, a red currant, a gooseberry, a lingonberry, thyme, a basil, a valerian, a fennel, a parsley, a camomile, a tarragon, a lavender, a dill, a cumin, a bergamot, a sage, an aloe vera, a spearmint, a peppermint, and an eucalyptus.

6. The method according to claim 2, wherein the natural vegetable flavoring agent has been freeze-dried.

7. The method according to claim 2, wherein the at least one natural vegetable flavoring agent is in the form of a powder, said powder comprising a particle having a particle size of at most 3 mm, calculated as the longest dimension of the particle.

8. The method according to claim 2, wherein said powder consists essentially of particles having a particle size from 3 μm to 2 mm, calculated as the longest dimension of the particle.

9. The method according to claim 2, wherein the at least one natural vegetable flavoring agent comprises seed from a fruit.

10. The method according to claim 2, wherein the at least one natural vegetable flavoring agent also provides the gum formulation with natural color.

11. The method according to claim 2, wherein the coating furthermore comprises a flavor selected from the group consisting of peppermint, periwinkle, eucalyptus, spearmint, anethol, menthol, powdered anise, orange, lemon, mango, pineapple, lime, strawberry, cherry, black currant, blueberry, raspberry, wild berry, cranberry, apple, pear, banana, prune, and plum flavor.

12. The method of claim 2, wherein the coating furthermore comprises an active substance selected from the group consisting of a high potency sweetener and an acid.

13. The method according to claim 12, wherein said active substance is in the form of a powder when applied to the coating.

14. The method according to claim 12, wherein the acid is selected from the group consisting of a citric acid, a malic acid, a tartaric acid, a lactic acid, and an ascorbic acid.

15. The method according to claim 12, wherein the high potency sweetener is selected from the group consisting of aspartame, acesulfame K, saccharin, cyclamate, neohesiridine, thaumatin, glycyrrhizin, monellin, sucrolase, and alitame.

16. The method according to claim 2, wherein the coating furthermore comprises at least one functional substance, each selected from the group consisting of vitamins, cooling agents and flavor enhancers.

17. The method according to claim 16, wherein the at least one functional substance is in the form of a powder when applied to the coating.

18. The method according to claim 12, wherein the active substance is in an encapsulated form when applied to the coating.

19. The method according to claim 18, wherein the encapsulated active substance is encapsulated in one or more material(s) each selected from the group consisting of fatty substances, waxes, gelatine, gum arabic, starch, cellulose, cellulose derivatives, shellac, polyvinyl acetate, polyethylene, casein, zein, B cyclodextrine, silica, and yeast cells.

20. The method according to claim 2, wherein the coating furthermore comprises one or more active substances(s), incorporated into the coating while in liquid form, each of said one or more active substance(s) being selected from the group consisting of a flavor, a high potency sweetener and an acid.

21. The method according to claim 2, wherein the coating furthermore comprises at least one salt.

22. The method according to claim 21, wherein each salt is selected from the group consisting of sodium chloride, potassium chloride, ammonium chloride, sodium bicarbonate, and carbamide.

23. The method according to claim 2, wherein the coating suspension comprises an aqueous solution, said aqueous solution comprising a component selected from the group consisting of a sugar, a sugar alcohol, an artificial sweetener or a mixture thereof.

24. The method according to claim 2, wherein the coating suspension comprises an aqueous solution of one or more constituent(s) selected from the group consisting of saccharose, dextrose, sorbitol, xylitol, tagatose, mannitol, maltitol, isomalt, aspartame, acesulfame K, saccharine, cyclamate, taline, and neohespiridine.

25. The method according to claim 2, wherein the coating suspension is applied in 2 to 90 increments.

26. The method according to claim 2, wherein the flavoring agent is applied to the coating in 1 to 10 increment(s) between the dosages of the coating suspension.

27. The method of claim 2 wherein, during step 3), the natural vegetable flavoring agent is embedded, in the coating, in solid form.

* * * * *